Nov. 24, 1931.                H. M. RINEHART                1,833,759
                         ANIMAL RESTRAINING DEVICE
                           Filed Jan. 28, 1931
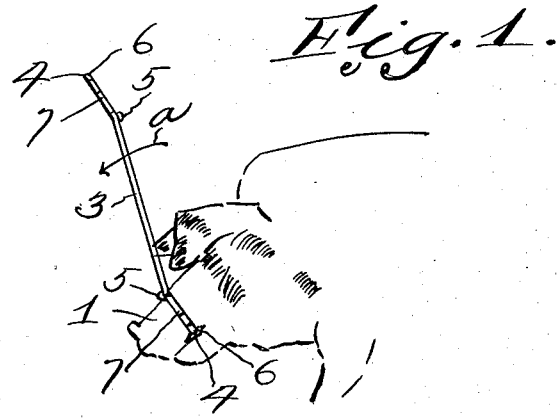
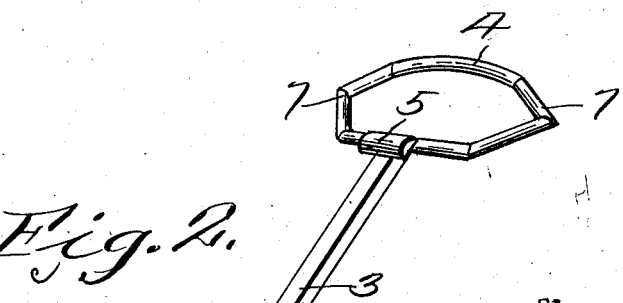
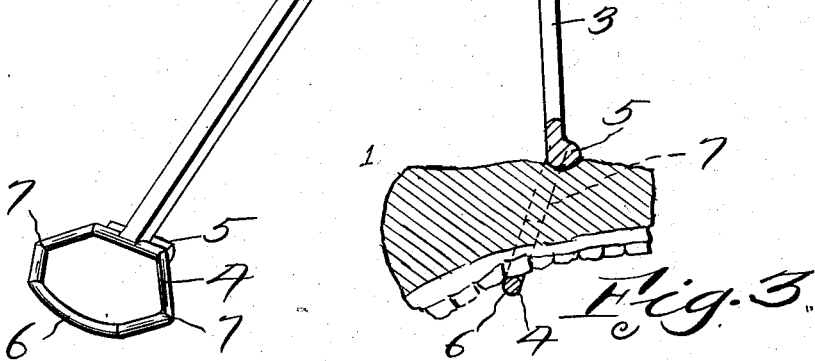
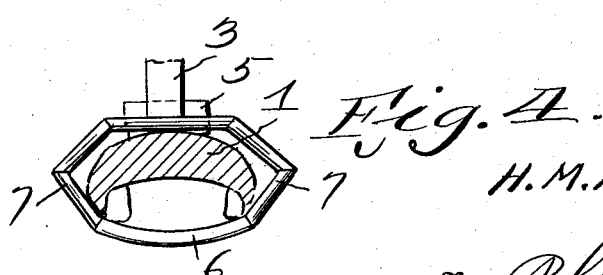
Inventor
H. M. Rinehart Patented Nov. 24, 1931

1,833,759

UNITED STATES PATENT OFFICE

HARVEY M. RINEHART, OF KNOXVILLE, ILLINOIS

ANIMAL RESTRAINING DEVICE

Application filed January 28, 1931. Serial No. 511,851.

The invention relates to animal restraining devices, particularly hog holders, and has for its object to provide a device of this character comprising a handle member having a loop at its end adapted to receive therein the upper jaw of the animal whereby the jaw may be held by the operator, rocking the handle and loop for holding the hog for various purposes, for instance when applying rings.

A further object is to provide the opposite ends of the handle member with loops of different sizes whereby the device may be used on pigs as well as hogs.

A further object is to angularly dispose the loops at obtuse angles to the handles and to provide lugs formed by transverse members at the points of angling of the loops, and forming fulcruming members for engagement with the upper side of the jaw during the rocking operation.

A further object is to curve the outer portions of the loops and to angularly shape the opposite sides of the loops whereby a pinching action on the flex of the jaw will be obviated.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a side elevation of the device, showing the same in position on the jaw of a hog, and ready to be rocked for the holding operation.

Figure 2 is a perspective view of the device.

Figure 3 is a vertical longitudinal sectional view through a portion of the upper jaw of the hog, and one of the loops, showing the device rocked for the gripping action.

Figure 4 is a vertical transverse sectional view through the upper jaw of a hog, showing one of the loops in elevation.

Referring to the drawings the numeral 1 designates the upper jaw of a hog, however it is to be understood that the device hereinafter set forth, may be used in connection with any kind of animal, a hog being shown and described for purposes of illustration only.

The restraining device comprises an elongated handle member 3, the ends of which terminate in jaw receiving loops 4 adapted to receive the upper jaw 1 of the animal. Loops 4 are preferably at obtuse angles to the handle 3 and of different sizes for receiving jaws of different sizes.

In operation, the operator grasps the handle 3, and passes the desired loop 4 over the upper jaw 1 of the hog, however the other loop may be used as a handle. When the restraining device assumes the position shown in Figure 1, it is rocked in the direction of the arrow $a$ with the fulcruming lug 5 in engagement with the upper side of the jaw 1, as clearly shown in Figure 3. This action will place the loop 4 at an angle, other than a right angle, transversely of the jaw and will positively grip and hold the jaw and animal during the ringing or other operation desired.

Loops 4 have their outer portions 6 curved for engagement with the teeth, and for preventing pinching of the flesh. Opposite sides of the loops are angularly shaped as shown at 7, so that these sides, during the rocking of the loop will allow freedom sufficient to prevent pinching of the flesh as it bulges during the rocking operation as clearly shown in Figure 4. The lugs 5 are preferably elongated to form a relatively large bearing surface for preventing injury to the flesh on the upper side of the jaw.

From the above it will be seen that an animal restraining device is provided having loops at opposite ends thereof, adapted to receive jaws of different sizes, and fulcruming members provided adjacent the inner sides of the loops for preventing injury to the jaw incident to the fulcruming operation.

It will also be seen that by curving the portions 6 and providing the angular opposite sides 7, pinching of the mouth or jaw will be obviated.

The invention having been set forth what is claimed as new and useful is:—

1. An animal restraining device comprising an elongated handle member, a loop carried by the end of said handle member and a fulcruming member adjacent the point where the loop and handle joins.

2. An animal restraining device comprising an elongated handle member, an angularly disposed jaw receiving loop rigidly carried by said handle member and a fulcruming member carried by said handle member and loop at their angling point and on the outer side thereof.

3. An animal restraining device comprising an elongated handle member, an angularly disposed jaw receiving loop rigidly carried by the end of said handle member, a fulcruming lug carried by said handle member and loop, the opposite sides of said loop being outwardly angled, the outer side of the loop being curved.

4. An animal restraining device comprising an elongated handle member, angularly disposed jaw receiving loops at opposite ends of the handle member and angling in different directions, fulcruming lugs carried by said handle members and loops on the outer sides at their points of angling, the opposite sides of said loops being angularly shaped whereby during a rocking operation of the loops, opposite sides of a jaw will have freedom to expand.

In testimony whereof he hereunto affixes his signature.

HARVEY M. RINEHART.